United States Patent
Omura et al.

(10) Patent No.: US 11,389,830 B2
(45) Date of Patent: Jul. 19, 2022

(54) METHOD FOR FORMING MULTILAYER COATING FILM

(71) Applicant: KANSAI PAINT CO., LTD., Hyogo (JP)

(72) Inventors: Masahiro Omura, Aichi (JP); Hironori Tonomura, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 364 days.

(21) Appl. No.: 16/498,558

(22) PCT Filed: Mar. 26, 2018

(86) PCT No.: PCT/JP2018/012170
§ 371 (c)(1),
(2) Date: Sep. 27, 2019

(87) PCT Pub. No.: WO2018/181193
PCT Pub. Date: Oct. 4, 2018

(65) Prior Publication Data
US 2020/0061668 A1 Feb. 27, 2020

(30) Foreign Application Priority Data

Mar. 29, 2017 (JP) .............................. JP2017-065493

(51) Int. Cl.
| | | |
|---|---|---|
| B05D 7/00 | (2006.01) | |
| B05D 5/06 | (2006.01) | |
| C09D 5/00 | (2006.01) | |
| C09D 5/02 | (2006.01) | |
| C09D 5/36 | (2006.01) | |
| C09D 133/04 | (2006.01) | |

(52) U.S. Cl.
CPC ............... *B05D 7/577* (2013.01); *B05D 5/06* (2013.01); *C09D 5/002* (2013.01); *C09D 5/022* (2013.01); *C09D 5/36* (2013.01); *C09D 133/04* (2013.01)

(58) Field of Classification Search
None
See application file for complete search history.

(56) References Cited

U.S. PATENT DOCUMENTS

| | | | |
|---|---|---|---|
| 8,758,896 | B2 | 6/2014 | Imanaka et al. |
| 9,296,016 | B2 | 3/2016 | Nakano et al. |
| 2007/0104874 | A1 | 5/2007 | Ogawa et al. |
| 2010/0151258 | A1 | 6/2010 | Okuma |
| 2010/0247744 | A1 | 9/2010 | Koga et al. |
| 2013/0089731 | A1 | 4/2013 | Imanaka |
| 2018/0194111 | A1 | 7/2018 | Yamane et al. |

FOREIGN PATENT DOCUMENTS

| | | |
|---|---|---|
| CN | 101670334 A | 3/2010 |
| JP | 2002086057 A | 3/2002 |
| JP | 2003093966 A2 | 4/2003 |
| JP | 2004351389 A | 12/2004 |
| JP | 2004351390 A | 12/2004 |
| JP | 2010234179 A | 10/2010 |
| JP | 2011206662 A | 10/2011 |
| JP | 2012045478 A | 3/2012 |
| JP | 2012157827 A | 8/2012 |
| JP | 2013535311 A | 9/2013 |
| JP | 2016083631 A | 5/2016 |
| JP | 2016185527 A | 10/2016 |
| WO | 17006530 A1 | 1/2017 |

OTHER PUBLICATIONS

International Search Report in PCT/JP2018/012170 dated Jun. 5, 2018 (pp. 1-3).
Search Report dated Dec. 18, 2020, in corresponding European Patent Application No. 18775340.5 (pp. 1-4).
Zhang Tie Cheng Ed.; Encyclopedia of Application of Manufacturing Technology, Nov. 30, 2004 (p. 209) and english translation thereof (.

*Primary Examiner* — Shamim Ahmed
*Assistant Examiner* — Bradford M Gates
(74) *Attorney, Agent, or Firm* — Millen, White, Zelano & Branigan, PC; Ryan Pool

(57) ABSTRACT

A multilayer coating film forming method to form a multilayer coating film having a glittering appearance. Forming a multilayer coating film by sequentially applying, on top of a base material, a first base coating material, a second base coating material, and a clear coating material in a wet-on-wet process, wherein: the first base coating material is a transparent or colored coating material; the second coating material contains a flaky lustrous pigment; the amount of flaky lustrous pigment being 10-60 parts by mass to 100 parts by mass of resin solid content in the second base coating material, and the concentration of solids in the coating falls being 5-20 mass % with respect to the total mass of the second base coating material; and the thickness of a coating film obtained from the second base coating material falls being 1-8 μm on the basis of the coating film when cured.

7 Claims, No Drawings

METHOD FOR FORMING MULTILAYER COATING FILM

FIELD

The present invention relates to a method for forming a multilayer coating film which can form a multilayer coating film having excellent luster.

BACKGROUND

Coating an automobile body is usually performed by forming an electrodeposited coating film, an intermediate coating film, and a top coating film in that order on the object to be coated. In conventional methods, after electrodeposition coating by immersing the object to be coated in electrodeposition coating material, the coating material is cured by baking at high temperatures to form the electrodeposited coating. Then, after applying an intermediate coating material over the electrodeposited coating film, the intermediate coating film is formed by baking, and after a top coating material is further applied over the intermediate coating film, the top coating film is formed by baking.

For example, multilayer coating films with a metallic paint color or a mica paint color, which have become popular in recent years are formed using a base coating material comprising a lustrous pigment for obtaining high luster and a transparent clear coating material as a top coating material. In general, coating films with high luster demonstrate a remarkable change in brightness depending on the angle of observation, and the lustrous pigments are comparatively uniformly spread throughout the coating films, which do not demonstrate significant metallic irregularity. Additionally, as stated above, when the change in brightness according to angle of observation is remarkable, in general, flip-flop is high.

Conventionally, as lustrous pigments, aluminum flake pigments having a metallic luster are used for a metallic paint color, and mica having interference is used for mica coating materials. In general, in multilayer coating films with these colors, a base coating material comprising a lustrous pigment and a clear coating material are successively applied in a wet-on-wet manner on a baked intermediate coating film, and then the obtained uncured coating film is cured by a single bake to form the coating film.

However, when metallic-colored or mica-colored multilayer coating films are formed using wet-on-wet coating, there is the problem that luster decreases due to the irregularity of the orientation of the lustrous pigment contained in the base coating material.

Additionally, adoption of aqueous coating materials has increased in recent years from the point of view of reducing environmental burden. For aqueous coating materials, the volatilization rate of water, which is a dilution solvent, is slow and is greatly influenced by coating environment conditions such as temperature and humidity. Thus, there is the problem that, when coating in a wet-on-wet manner using an aqueous coating material, irregularity of the orientation of the lustrous pigments becomes more likely than when using organic solvent-type coating materials, resulting in a more noticeable decrease in luster.

In order to solve the aforementioned problems, various methods have conventionally been proposed.

For example, PTL 1 and PTL 2 disclose a method for forming a lustrous coating film comprising the steps of forming an uncured first base coating film by applying an aqueous first base lustrous coating material on an intermediate coating film, forming an uncured second base coating film by applying an aqueous second base lustrous coating material on the uncured first base coating film, forming a clear coating film by applying a clear coating material on the uncured second base coating film, and heat curing the uncured first base coating film, the second base coating film, and the clear coating film all at once. These documents describe that, in the above method, by adjusting the coating material solid content or the concentration of a lustrous pigment in the aqueous first base lustrous coating material or the aqueous second base lustrous coating material, it is possible to obtain a lustrous coating film that has a metallic appearance with no unevenness in luster, in the case of using aluminum flake pigments having metallic luster, and additionally demonstrates extremely high flip-flop, in the case of using mica pigments having interference.

However, in the method for forming a lustrous coating film described in PTL 1 and PTL 2, particularly in coating automobile bodies, the finish of the inner plate coating film is influenced by the spray dust of the base coating material for outer plate use, such that there was the problem that the luster of the inner plate coating film could be lost depending on the type of lustrous material and paint color.

CITATION LIST

Patent Literature

[PTL 1] Japanese Unexamined Patent Publication (Kokai) No. 2004-351389

[PTL 2] Japanese Unexamined Patent Publication (Kokai) No. 2004-351390

SUMMARY

Technical Problem

The object of the present invention is to provide a method for forming a multilayer coating film which can form a multilayer coating film having excellent luster, resolving the above issues.

Solution to Problem

Specifically, the present invention relates to a method for forming a multilayer coating film comprising successively coating, in a wet-on-wet manner, a first base coating material, a second base coating material, and a clear coating material on a substrate in that order, wherein the first base coating material is a transparent coating material or a colored coating material, the second base coating material comprises a flake-like lustrous pigment, the content of the flake-like lustrous pigment being in the range from 10 to 60 parts by mass relative to 100 parts by mass of the resin solid content in the second base coating material, the concentration of the coating material solid content in the second base coating material being in the range from 5 to 20 mass % relative to the total mass of the second base coating material, and the thickness of the coating formed by the second base coating material being in the range from 1 to 8 μm based on the cured coating film.

Advantageous Effects of Invention

The method of the present invention enables the formation of a multilayer coating film having extremely excellent luster, wherein the finish of the inner plate coating film thereof is not affected by dust of the base coating material for outer plate use, particularly in automobile body coating, by applying a thin layer of a second base coating material, which has a relatively low coating material solid content and relatively high pigment concentration of a lustrous pigment, as a thin film over a coating film of a first base coating material comprising a transparent coating material or a colored coating material.

DESCRIPTION OF EMBODIMENTS

The method of the present invention is directed to the formation of a multilayer coating film by successively applying a first base coating material, a second base coating material, and a clear coating material on a substrate in a wet-on-wet manner.

As a substrate, metals such as iron, zinc, aluminum, magnesium, etc., and alloys thereof, as well as moldings which have undergone plating or deposition with one of the above metals, and moldings of glass, plastic, and foam bodies, etc. can be used. These materials can undergo degreasing treatment and surface treatment, and be used as substrates as necessary. As the substrate, it is particularly preferable to use metal materials, materials which have undergone plating or deposition with a metal, or either of the above which have undergone a degreasing treatment or surface treatment.

A primer coating film or an intermediate coating film can be formed on one of the above materials to form a substrate. A primer coating film is for hiding the basic material surface or imparting anti-corrosion or anti-rust characteristics to the material, and is obtained by applying, drying, and curing a primer coating material. The type of primer coating material is not particularly limited, and can be, for example, electrodeposition coating material, primer, or the like. The intermediate coating film is for hiding the material surface or primer coating film, or imparting adhesive or anti-chipping characteristics, and is obtained by applying an intermediate coating material on the material surface or the primer coating film, drying, and curing. The type of intermediate coating material is not particularly limited, and known materials, for example, aqueous or organic solvent-type intermediate coating materials having thermosetting resin compositions and pigments as necessary ingredients can be used.

The first base coating material of the present invention is applied over the above substrate, and is a transparent coating material or a colored coating material. If the first base coating material is a transparent coating material, it can comprise an extender pigment as necessary, without comprising a color pigment. As the extender pigment, for example, barium sulfate, barium carbonate, calcium carbonate, aluminum silicate, silica, magnesium carbonate, talc, alumina white, or the like, can be used.

If the above extender pigment is included, the content of the extender pigment is preferably in the range of 0.1 to 40 parts by mass, or more preferably in the range from 5 to 30 parts by mass, relative to 100 parts by mass of resin solid content in the coating material.

If the first base coating material is a colored coating material, the first base coating material can contain color pigment. The color pigment is not particularly restricted, but specifically, one or a combination of any of composite metal oxide pigments such as titanium oxide pigment, iron oxide pigment, or titanium yellow; azo pigment, quinacridone pigment, diketopyrrolopyrrole pigment, perylene pigment, perinone pigment, benzimidazolone pigment, isoindoline pigment, isoindolinone pigment, metal chelate azo pigment, phthalocyanine pigment, indanthrone pigment, dioxane pigment, threne pigment, indigo pigment, carbon black pigment, or the like, can be used.

If the above color pigment is included, a suitable content of the color pigment is in the range from 0.003 to 20 parts by mass, preferably in the range from 0.005 to 10 parts by mass, or more preferably 0.007 to 5 parts by mass, relative to 100 parts by mass of the resin solid content in the coating material.

The above first base coating material is preferably a coating material with low tinting strength, from the perspective of preventing reduction in luster due to dust scattering onto the inner plates. More specifically, the light transmittance of the coating film formed by the first base coating material is preferably in the range of 80 to 100%, more preferably 90 to 100%, and even more preferably 95 to 100%. The above light transmittance is the average light transmittance in the wavelength region from 400 to 700 nm of the cured coating film with a thickness of 10 μm, and the average light transmittance is the value measured by a spectrophotometer "MPS-2450" (trade name: Shimadzu) using a coating film in which a first base coating material was applied on a smooth PTFE, sheet such that thickness of the cured coating film was 10 μm, then cured, and removed.

The second base coating material of the present invention is applied over the coating film of the above first base coating material, and contains a flake-like lustrous pigment. As the flake-like lustrous pigment, for example, a flake-like metallic pigment such as aluminum, copper, nickel alloy, stainless steel, or the like, flake-like metallic pigment in which the surface is covered by a metal oxide, a flake-like metallic pigment with color pigment chemically adsorbed on the surface, a flake-like aluminum pigment with an aluminum oxide layer formed on the surface by an oxidation-reduction reaction, an aluminum solid solution sheet oxidized iron pigment, a glass flake pigment, a glass flake pigment coated with metal oxide on the surface, a glass flake pigment with a color pigment chemically adsorbed on the surface, a glass flake pigment coated with metal on the surface, an interference mica pigment coated with titanium dioxide on the surface, a reduced mica pigment reduced from interference mica pigment, a colored mica pigment with a color pigment chemically adsorbed on the surface or coated with iron oxide on the surface, a graphite pigment coated with titanium dioxide on the surface, a titanium dioxide coated flake-like pigment such as silica flake and alumina flake pigment coated with titanium dioxide on the surface, a sheet oxidized iron pigment, a hologram pigment, a synthetic mica pigment, a cholesteric liquid crystal polymer pigment having a helical structure, or a bismuth oxychloride pigment can be used. Of these, aluminum flake and/or titanium oxide coated flake-like pigments are preferably used as the flake-like lustrous pigment.

In the present invention, the amount of the above flake-like lustrous pigment in the above second base coating material is within the range of 10 to 60 parts by mass relative to 100 parts by mass of the coating material solid content contained in the second base coating material. Specifically, the amount of the flake-like lustrous pigment, from the perspective of luster and smoothness of the coating formed, is preferably in the range of 15 to 55 parts by mass, or more preferably in the range of 20 to 50 parts by mass, relative to 100 parts by mass of the resin solid content in the coating material.

The second base coating material can contain a conventionally known color pigment or an extender pigments as necessary. The color pigment and extender pigment are not particularly restricted, but can be appropriately selected from the group of color pigments and extender pigments described in the above explanation of the first base coating material.

In the present invention, the first base coating material and the second base coating material can be any of an aqueous coating material, or a solvent-based coating material, and the film-forming resin can be, for example, an acrylic resin, polyester resin, alkyd resin, polyurethane resin, or the like. These coating materials are preferably aqueous coating materials comprising, as a film-forming resin ingredient, in particular an acrylic resin emulsion (a), a film-forming resin (b) other than (a), and a curing agent (c).

The acrylic resin emulsion (a) is formed by emulsion dispersion of an acrylic resin in an aqueous medium, and can be, for example, an emulsion created by emulsion polymerization of a polymerizable unsaturated monomer mixture.

The acrylic resin emulsion (a), in particular, is preferably a core-shell-type emulsion consisting of a core portion comprising copolymer (I), and a shell portion comprising copolymer (II). Furthermore, the copolymer (I) is obtained by copolymerization of a polymerizable unsaturated monomer (a1) having at least 2 polymerizable unsaturated groups per molecule and a polymerizable unsaturated monomer (a2) other than polymerizable unsaturated monomer (a1), and the copolymer (II) is obtained by copolymerization of a plurality of polymerizable unsaturated monomers (a3). This is preferable from the perspective of appearance of the coating film and improving water resistance.

As the polymerizable unsaturated monomer (a1) above, for example, ethylene glycol di(meth)acrylate, triethylene glycol di(meth)acrylate, tetraethylene glycol di(meth)acrylate, 1,6-hexanediol di(meth)acrylate, allyl(meth)acrylate, divinyl benzene, trimethylol propane triacrylate, methylene bis(meth)acrylamide, ethylene bis(meth)acrylamide, or any combination thereof, can be used.

In the present specification, "(meth)acrylate" means acrylate and/or methacrylate.

The polymerizable unsaturated monomer (a2) other than the above polymerizable unsaturated monomer (a1) (hereinafter occasionally referred to as, simply, "polymerizable unsaturated monomer (a2)") is a monomer having one polymerizable unsaturated group per molecule and copolymerizable with the polymerizable unsaturated monomer (a1), and the polymerizable unsaturated group encompasses compounds having, for example, a vinyl group, a (meth) acryloyl group, or the like.

Specific examples of the polymeric unsaturated monomer (a2) include alkyl or cycloalkyl(meth)acrylates such as methyl(meth)acrylate, ethyl(meth)acrylate, n-propyl(meth) acrylate, isopropyl(meth)acrylate, n-butyl(meth)acrylate, isobutyl(meth)acrylate, tert-butyl(meth)acrylate, n-hexyl (meth)acrylate, n-octyl(meth)acrylate, 2-ethylhexyl(meth) acrylate, nonyl(meth)acrylate, tridecyl(meth)acrylate, lauryl (meth)acrylate, stearyl(meth)acrylate, isostearyl acrylate (Osaka Organic Chemical Industry Co., Ltd. trade name), cyclohexyl(meth)acrylate, methyl cyclohexyl(meth)acrylate, t-butylcyclohexyl(meth)acrylate, cyclododecyl(meth) acrylate; polymerizable unsaturated monomers having an isobornyl group, such as isobornyl(meth)acrylate; polymerizable unsaturated monomers having an adamantyl group, such as adamantyl(meth)acrylate; vinyl aromatic compounds, such as styrene, α-methylstyrene and vinyltoluene; polymerizable unsaturated monomers having an alkoxysilyl group, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyl triethoxysilane; perfluoroalkyl(meth)acrylates, such as perfluorobutylethyl(meth)acrylate and perfluorooctylethyl (meth)acrylate; polymerizable unsaturated monomers having a fluorinated alkyl group such as fluoroolefin; monomers having a photopolymerizable functional group, such as a maleimide group; vinyl compounds, such as N-vinylpyrrolidone, ethylene, butadiene, chloroprene, vinyl propionate and vinyl acetate; carboxyl group-containing polymerizable unsaturated monomers, such as (meth)acrylic acid, maleic acid, crotonic acid, and β-carboxyethyl acrylate; nitrogen-containing polymerizable unsaturated monomers, such as (meth)acrylonitrile, (meth)acrylamide, N,N-dimethylaminoethyl(meth)acrylate, N,N-dimethylaminopropyl(meth)acrylamide, and adducts of glycidyl(meth)acrylate with amines; hydroxy group-containing polymerizable unsaturated monomers, such as monoesterified products of a (meth)acrylic acid, such as 2-hydroxyethyl(meth)acrylate, 2-hydroxypropyl(meth)acrylate, 3-hydroxypropyl(meth)acrylate, and 4-hydroxybutyl(meth)acrylate, and a dihydric alcohol having 2 to 8 carbon atoms, E-caprolactone modified products of monoesters of (meth)acrylate and dihydric alcohols of 2 to 8 carbon atoms, N-hydroxymethyl(meth)acrylamide, allyl alcohol, and (meth)acrylate having a polyoxyethylene chain in which the molecular terminal is a hydroxy group; epoxy group-containing polymerizable unsaturated monomers, such as glycidyl(meth)acrylate, β-methylglycidyl(meth) acrylate, 3,4-epoxycyclohexylmethyl(meth)acrylate, 3,4-epoxycyclohexylethyl(meth)acrylate, 3,4-epoxycyclohexylpropyl(meth)acrylate, and allyl glycidyl ether; (meth) acrylate having a polyoxyethylene chain whose molecular terminal is an alkoxy group; sulfonic acid group-containing polymerizable unsaturated monomers, such as 2-acrylamido-2-methylpropanesulfonic acid, allylsulfonic acid, sodium styrenesulfonate, sulfoethyl methacrylate, and sodium salts or ammonium salts thereof; phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate; monomers having an ultraviolet absorbing functional group, such as 2-hydroxy-4-(3-methacryloyloxy-2-hydroxypropoxy) benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole; monomers having ultraviolet stability, such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.; monomer compounds containing carbonyl groups, such as acrolein, diacetone acrylamide, diacetone methacrylamide, acetoacetoxyethyl methacrylate, formyl styrene, and vinyl alkyl ketones having 4 to 7 carbon atoms (e.g., vinyl methyl ketone, vinyl ethyl ketone, vinyl butyl ketone); and any combination thereof can be used.

When manufacturing the copolymer (I), the polymerizable unsaturated monomer (a1) is preferably, in the range of 0.1 to 20 mass %, more preferably 0.2 to 10 mass %, or even more preferably 0.7 to 4 mass %, based on the total mass of polymerizable unsaturated monomer (a1) and polymerizable unsaturated monomer (a2). Additionally, the polymerizable unsaturated monomer (a2) is preferably in the range of 80 to 99.9 mass %, more preferably 90 to 99.8%, and even more preferably 96 to 99.3%, based on the total mass of polymerizable unsaturated monomer (a1) and polymerizable unsaturated monomer (a2), which is suitable from the perspectives of stability during manufacture, water resistance of the coating film obtained, and improved weather resistance, etc.

As the polymerizable unsaturated monomer (a3), a plurality of which form the shell portion of copolymer (II), any of the monomers indicated for the aforementioned polymerizable unsaturated monomer (a2) can be appropriately used. From the perspective of achieving stability within the aqueous medium of the obtained core-shell-type emulsion, as the polymerizable unsaturated monomer (a3) in the shell portion of copolymer (II), a carboxyl group-containing monomer is preferred. As the above carboxyl group-containing monomer, in particular, acrylic acid and/or methacrylic acid is preferred. From the perspective of stability in the aqueous medium of the emulsion resin and water-resistance of the obtained coating film, the amount of carboxyl group-containing monomer is preferably in the range of 1 to 40 mass %, more preferably 6 to 25 mass %, or even more preferably 7 to 19 mass %, based on the total mass of the plurality of polymerizable unsaturated monomers (a3), in order to improve storage stability and water-resistance of the obtained coating film.

Additionally, from the perspective of achieving stability in the aqueous medium of the obtained emulsion resin, it is preferable that the plurality of polymerizable unsaturated monomers (a3), which form the shell portion of copolymer (II), comprise one of the above hydroxy group-containing monomers as at least a portion of the ingredients thereof, in order to improve stability in the aqueous medium of the emulsion. As the hydroxy group-containing monomer, in particular, 2-hydroxyethyl(meth)acrylate, 2-hydroxypropyl (meth)acrylate, 3-hydroxypropyl (meth) acrylate, or 4-hydroxybutyl (meth) acrylate are preferable. From the perspective of stability in the aqueous medium of the emulsion resin and water-resistance, etc., of the obtained coating film, the amount of hydroxy group-containing monomer is generally in the range of 1 to 40 mass %, preferably 3 to 25 mass %, or more preferably 4 to 20% mass %, based on the total mass of the plurality of polymerizable unsaturated monomers (a3), in order to improve storage stability and water-resistance of the obtained coating film.

The core-shell-type emulsion can be obtained, for example, by emulsion polymerizing a monomer mixture (1) of polymerizable unsaturated monomer (a1) and a polymerizable unsaturated monomer (a2) in the above percentages to form a copolymer (I), then adding a monomer mixture (2) of a plurality of polymerizable unsaturated monomers (a3), and emulsion polymerizing again. The emulsion polymerization of monomer mixture (1) can be performed by known methods, for example, by using a polymerization initiator in the presence of an emulsifier. The monomer mixture (2) can contain a polymerization initiator, a chain transfer agent, a reducing agent, an emulsifier, etc., as desired.

In the core-shell-type emulsion, the core is a copolymer (I) formed from a monomer mixture (1) comprising a polymerizable unsaturated monomer (a1) and a polymerizable unsaturated monomer (a2), and the shell is a copolymer (II) formed from a monomer mixture (2) comprising a plurality of polymerizable unsaturated monomer (a3). A suitable ratio of copolymer (I) to copolymer (II) in the core-shell-type emulsion, from the perspective of metallic evenness of the obtained coating film, in the solid portion mass ratio of copolymer (I)/copolymer (II), is generally in the range 5/95 to 95/5, particularly 30/70 to 92/8, or more particularly 40/60 to 90/10. Generally, if the ratio of copolymer (I) to copolymer (II) is less than 5/95, metallic unevenness tends to become noticeable, and if the ratio exceeds 95/5, homogeneity of the decorative layer can be lost.

As the acrylic resin emulsion (a), a single-layer-type acrylic resin emulsion obtained by single-stage emulsion polymerization can be used.

The acrylic resin emulsion (a) obtained above has a resin acid value preferably in the range of 5 to 90 mg KOH/g, more preferably 8 to 50 mg KOH/g, or even more preferably 10 to 35 mg KOH/g, from the perspective of storability, water resistance, etc., of the coating film obtained. Additionally, acrylic resin emulsion (a) has a resin hydroxy value preferably in the range of 1 to 70 mg KOH/g, more preferably 2 to 50 mg KOH/g, even more preferably 5 to 30 mg KOH/g, from the perspective water resistance, etc., of the coating film obtained.

As the film-forming resin (b) other than the above acrylic resin emulsion (a), a polyester resin, acrylic resin other than (a), alkyd resin, polyurethane resin, silicone resin, epoxy resin, etc., can be used.

The above polyester resin can be obtained by an esterification reaction of a polyhydric alcohol and a polybasic acid, and monobasic acid and oil, etc., as desired, to prepare an oil-free or oil-modified carboxyl group-containing polyester resin, which can be neutralized as desired.

The polyester resin preferably comprises both a hydroxy group and a carboxyl group, has a hydroxy value in the range of preferably 10 to 300 mg KOH/g, more preferably 50 to 250 mg KOH/g, or even more preferably 80 to 180 mg KOH/g, and has an acid value in the range of preferably 1 to 200 mg KOH/g, more preferably 15 to 100 mg KOH/g, and even more preferably 25 to 60 mg KOH/g.

Additionally, the above polyester resin has a number average molecular weight generally in the range of 1,000 to 50,000, and preferably in the range of 1,300 to 20,000.

In the present specification, the number average molecular weight and the weight average molecular weight refer to values measured using tetrahydrofuran as the solvent, and "HLC-8120GPC" (trade name, Tosoh) as the gel permeation chromatograph, a total of 4 columns, one column of "TSK-gel G4000HXL", two columns of "TSKgel G3000HXL", and one column of "TSKgel G2000HXL" (all trade names of Tosoh), and a differential refractometer as the detection device, under the conditions of mobile phase: tetrahydrofuran, measurement temperature: 40° C., and flow rate: 1 mL/min.

Basic substances can be used to neutralize the carboxyl group of the polyester resin. The basic substance is preferably aqueous, and can be, specifically, for example, one or a combination of ammonia, methyl amine, ethyl amine, propyl amine, butyl amine, dimethyl amine, trimethyl amine, triethyl amine, ethylene diamine, morpholine, 2-(methylamino)ethanol, 2-(dimethylamino) ethanol, diethanolamine, triethanolamine, diisopropanolamine, and 2-amino-2-methylpropanol.

The above acrylic resin is different than the aforementioned acrylic resin emulsion (a), and can be, for example, a carboxyl group-containing acrylic resin obtained by copolymerization of a monomer mixture of a hydrophilic group-containing monomer such as an above carboxylic group-containing polymerizable unsaturated monomer and a hydroxy group-containing polymerizable unsaturated monomer, and in particular having a weight average molecular weight in the range of 1,000 to 200,000, preferably 2,000 to 100,000, more preferably 3,000 to 80,000, and even more preferably 5,000 to 70,000.

The carboxyl group of the acrylic resin above can be neutralized using the aforementioned basic substance. Additionally, the above acrylic resin preferably has a hydroxy value in the range of 1 to 200 mg KOH/g, more preferably 2 to 100 mg KOH/g, or even more preferably 3 to 80 mg KOH/g, and an acid value in the range of 1 to 200 mg KOH/g, more preferably 2 to 150 mg KOH/g, or even more preferably 5 to 100 mg KOH/g.

As the curing agent (c), for example, an amino resin, a polyisocyanate compound, a blocked polyisocyanate compound, an epoxy group-containing compound, a carboxyl group-containing compound, a carbodiimide group-containing compound, a hydrazide group-containing compound, or a semicarbazide group-containing compound can be used. Of these, amino resins that can react with hydroxy groups, polyisocyanate compounds and blocked polyisocyanate compounds, and carbodiimide group-containing compounds that can react with carboxyl groups are preferable. The curing agent can be a single substance or a combination of two or more substances.

In the first base coating material and the second base coating material, the amounts of acrylic resin emulsion (a), film-forming resin (b) other than acrylic resin emulsion (a), and curing agent (c) can be appropriately determined. From the perspective of the appearance, water-resistance, and anti-weather characteristics of the obtained coating film, based on a total of 100 parts by mass of the resin solid portion, the solid portion of the acylic resin emulsion (a) is preferably in the range of 5 to 50 parts by mass, or particularly 10 to 45 parts by mass, the solid portion of the film-forming resin (b) other than the acrylic resin emulsion (a) is preferably in the range of 5 to 60 parts by mass, or particularly 10 to 55 parts by mass, and the solid portion of the curing agent is preferably in the range of 5 to 50 parts by mass, or particularly 10 to 45 parts by mass.

The first base coating material and the second base coating material can comprise, as necessary, various coating additives such as thickeners, curing catalysts, UV absorbers, light stabilizers, antifoamers, plasticizers, surface conditioners, and anti-settling agents.

In the present invention, the method for applying the first base coating material and second base coating material is not particularly limited, and can be, for example, air spray coating, airless spray coating, rotating atomization coating, etc. Using these application methods, wet films can be successively formed on the object to be coated. These application methods can use electrostatic charging as necessary. In particular, an electrostatic coating for rotating atomization coating and an electrostatic application for airless spray coating are preferable, and electrostatic application for rotating atomization coating is particularly preferable.

Additionally, when performing air spray coating, airless spray coating, or rotating atomization coating, it is preferable to use water and/or an organic solvent in the proper amounts to adjust the respective viscosities to the proper viscosity range for that coating method. The first base coating has a coating material solid portion concentration preferably in the range of 16 to 50 mass %, more preferably 20 to 50 mass %, even more preferably 21 to 45 mass %, and most preferably 26 to 40 mass %. Additionally, the second base coating has a coating material solid portion concentration in the range of 5 to 20 mass %, in particular, preferably in the range of 8 to 15 mass %.

An interval of 30 seconds to 3 minutes without preheating is preferable for the period of time from the completion of applying the first base coating material to the initiation of applying the second base coating material.

The first base coating film has a dry film thickness preferably in the range of 5 to 15 μm, and particularly of 7 to 13 μm. Additionally, the second base coating film has a dry film thickness in the range of 1 to 8 μm, and particularly of 2 to 6 μm.

The method of the present invention can form coating films with superior luster, and is therefore suitable for use on outer plate parts of automobile bodies.

A coating line for an automobile body is normally divided into individual zones each using the same type of coating material to prevent degradation of coating quality due to adherence of scattered coating material on the coating film or object to be coated. For example, an automobile coating line is generally divided into a primer coating material application zone, an intermediate coating material application zone, a base coating material application zone, and a clear coating material application zone.

Additionally, in each application zone, normally, application is divided into two or more stages, with 30 seconds to 3 minutes of setting between the two or more stages, thereby preventing running of the coating material, etc., and achieving high coating quality. The application stages performed within the same zone are referred to as first stage, second stage and so on, starting from the stage performed first.

This type of application method is called "multi-stage application", such that, for example, if there are two stages of application within the same zone, the method is called "two-stage application". Of these, it is preferable that, using the method of the present invention in the base coating material application stage, the first base coating material be applied in the first stage, and the second base coating material be applied in the second stage.

In the method of the present invention, as described above, a first base coating material and a second base coating material are successively applied in a wet-on-wet manner, and then a clear coating material is applied onto the obtained multilayer coating film while it is in the uncured state.

In the above coating line for an automobile body, after an inner plate base coating material is applied on an inner surface of an automobile body on which an electrodeposited coating film or an intermediate coating film has been formed and an inner plate coating film is formed, an outer plate first base coating material, an outer plate second base coating material, and a clear coating material are successively applied on an outer plate surface of the above automobile body and an outer plate multilayer coating film is formed.

The above first base coating material can be used for the above outer plate first base coating material, and the above second base coating material can be used for the outer plate second base coating material.

As the inner plate base coating material, there is no particular restriction as long as the coating material has similar designability as the outer plate second base coating material, and the same coating material can be used.

As the above inner plate base coating material, a coating material comprising flake-like lustrous pigment is suitable for use from the perspective of the finish of the inner plate coating film surface formed. As the flake-like lustrous pigment, for example, a flake-like lustrous pigment indicated in the description of the second base coating material above can be used.

When the above inner plate base coating material comprises a flake-like lustrous pigment, the amount of the flake-like lustrous pigment is, from the perspective of the finish of the inner plate coating film surface formed, preferably in the range of 5 to 60 parts by mass relative to 100 parts by mass of the resin solid portion in the inner plate base coating.

The above clear coating material can be, for example, an organic solvent-type thermosetting coating composition, an aqueous thermosetting coating composition, a thermosetting powder coating composition, or the like, comprising a curing agent and a base resin comprising a crosslinkable functional group.

As the crosslinkable functional group included in the base resin, for example, a carboxyl group, a hydroxy group, an epoxy group, or a silanol group can be used. As the type of base resin, an acrylic resin, a polyester resin, an alkyd resin, a urethane resin, an epoxy resin, a fluorine resin or the like can be used. As the curing agent, for example, a polyisocyanate compound, blocked polyisocyanate compound, melamine resin, urea resin, carboxyl group-containing compound, carboxyl group-containing resin, epoxy group-containing resin, or epoxy group-containing compound can be used.

Additionally, the above clear coating material can comprise, as necessary, color pigments, lustrous pigments, dyes, matting agents, etc., insofar as transparency is not hindered, as well as extender pigments, UV absorbers, light stabilizers, antifoamers, thickeners, rust inhibitors, and surface conditioners.

The clear coating material can be applied using a method such as electrostatic coating, air spray, or airless spray. A film thickness in the range of 20 to 50 µm is suitable based on the cured coating film.

Additionally, the above clear coating material can be applied over the aforementioned inner plate base coating material. In such a case, the clear coating material can be applied after the outer plate second base coating material has been applied and before the outer plate clear coating material is applied. The clear coating material applied on the inner plate base coating material can be the same coating material as the clear coating material applied on the outer plate, or can be a different coating material therefrom.

In the method of the present invention, the coating film comprising the above first base coating material, second base coating material, and clear coating material is simultaneously heated and cured. The heating means can be, for example, hot air heating, infrared heating, or high frequency heating, and the heating temperature is preferably 80 to 160° C., or more preferably 100 to 140° C. Also, the heating period is preferably 10 to 60 minutes, or more preferably 15 to 40 minutes.

EXAMPLES

The present invention will be explained below using Examples and Comparative Examples. However, the present invention is not limited to these Examples. Furthermore, "part" and "percent" are both used as mass units.

Manufacturing Acrylic Resin Emulsion (a)

Manufacturing Example 1

128 parts of deionized water and 2 parts of "Adeka Ria Soap SR-1025" (trade name, Adeka, emulsifier, active ingredient 25%) were loaded into a reaction vessel equipped with a thermometer, a thermostat, a stirrer, a reflux condenser, a nitrogen inlet tube, and a dropper, then stirred and mixed under a flow of nitrogen, and heated to 80° C.

Then, 1% of the total weight of the core portion monomer emulsion described below, and 5.3 parts of 6% ammonium persulfate aqueous solution were introduced into the reaction vessel and maintained for 15 minutes at 80° C. Thereafter, the remainder of the core portion monomer emulsion was dripped into the reaction vessel over 3 hours held at the same temperature, and upon completion of dripping, the mixture was left to mature for 1 hour. Then, the shell portion monomer emulsion below was dripped for 1 hour, and after 1 hour of maturation, 40 parts of 5% 2-(dimethylamino) ethanol aqueous solution was gradually added to the reaction vessel while the vessel was cooled to 30° C., the reaction mixture was extracted while being filtered through a 100 mesh nylon cloth, and acrylic resin emulsion with an average particle size of 100 nm, and solid portion content of 30% was obtained. The obtained acrylic resin emulsion had an acid value of 33 mg KOH/g and a hydroxy value of 25 mg KOH/g.

The core portion monomer emulsion: The core portion monomer emulsion was obtained by mixing with stirring of 40 parts of deionized water, 2.8 parts of "Adeka Ria Soap SR-1025", 2.1 parts of methylene bis acrylamide, 2.8 parts of styrene, 16.1 parts of methyl methacrylate, 28 parts of ethyl acrylate, and 21 parts of n-butyl acrylate.

The shell portion monomer emulsion: The shell portion monomer emulsion was obtained by mixing with stirring of 17 parts of deionized water, 1.2 parts of "Adeka Ria Soap SR-1025", 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate.

Manufacturing Film-Forming Resin (b) Other than (a)

Manufacturing Example 2

After loading a charge of 35 parts of propylene glycol monopropyl ether into a reaction vessel equipped with a thermometer, a thermostat, a stirrer, a reflux condenser, a nitrogen inlet tube, and a dropper, and raising the temperature to 85° C., a mixture of 30 parts of methyl methacrylate, 20 parts of 2-ethyl hexyl acrylate, 29 parts of n-butylacrylate, 15 parts of 2-hydroxy ethyl acrylate, 6 parts of acrylic acid, 15 parts of propylene glycol monopropyl ether, and 2.3 parts of 2,2'-azobis (2,4-dimethyl valeronitrile) was dripped into the reaction vessel over 4 hours, and after dripping completed, was allowed to mature for 1 hour. Then, an additional mixture of 10 parts of propylene glycol monopropyl ether and 1 part of 2,2'-azobis (2,4-dimethyl valeronitrile) was dripped over 1 hour, and after dripping completed, was allowed to mature for 1 hour. Further, 7.4 parts of diethanolamine was added to obtain a hydroxyl group-containing acyclic resin solution (b-1) with 55% solid content. The obtained hydroxyl group-containing acrylic resin had an acid value of 47 mg KOH/g, a hydroxy value of 72 mg KOH/g, and a weight average molecular weight of 58,000.

Manufacturing Example 3

109 parts of trimethylol propane, 141 parts of 1,6-hexane diol, 126 parts of 1,2-cyclohexane dicarboxylic acid anhydride, and 120 parts of adipic acid were loaded into a reaction vessel equipped with a thermometer, a thermostat, a stirrer, a reflux condenser, and a water separator. After heating the reaction vessel from 160° C. to 230° C. over 3 hours, the reaction mixture underwent a condensation reaction at 230° C. for 4 hours. Thereafter, in order to introduce a carboxylic group to the obtained condensation reaction product, 38.3 parts of trimellitic anhydride were added, and after the mixture reacted at 170° C. for 30 minutes, it was diluted with 2-ethyl-1-hexanol to obtain a hydroxy group-containing polyester resin solution (b-2) with 70% solid content. The obtained hydroxy group-containing polyester resin had an acid value of 46 mg KOH/g, a hydroxyl value of 150 mg KOH/g, and a number average molecular weight of 1,400.

Manufacture or Extender Pigment Dispersion

Manufacturing Example 4

180 parts (resin solid portion 100 parts) of the acrylic resin solution (b-1) obtained in Manufacturing Example 2, 360 parts of deionized water, 6 parts (solid portion 3 parts) of "Surfynol 104A" (trade name, Air Products and Chemicals Inc., antifoaming agent, solid portion 50%), and 250 parts of "Barifine BF-20" (trade name, Sakai Chemical, barium sulfate powder, average particle diameter 0.03 μm) were mixed, and then dispersed for 1 hour in a paint shaker, to obtain the extender pigment dispersion (P-1).

Manufacture of Color Pigment Dispersion

Manufacturing Example 5

18 parts (resin solid portion 10 parts) of the acrylic resin solution (b-1) obtained in Manufacturing Example 2, 10 parts of "Carbon MA-100" (trade name, Mitsubishi Chemical, carbon black), and 60 parts of deionized water were mixed, and after adjusting the pH to 8.2 with 2-(dimethylamino)ethanol, was dispersed for 30 minutes in a paint shaker, to obtain the color pigment dispersion (P-2).

Manufacture of Flake-Like Lustrous Pigment Dispersion Solution

Manufacturing Example 6

In a mixer, 10 parts of "GX-3110" (trade name, Asahi Kasei Metals Corporation, aluminum pigment paste, metal content 79%), 35 parts of 2-ethyl-1-hexanol, 5 parts of phosphoric acid group-containing resin solution (*Note 1), and 0.2 parts of 2-(dimethylamino)ethanol were mixed until homogeneous to obtain the flake-like lustrous pigment dispersion (P-3-1).
(*Note 1)
Phosphoric acid group-containing resin solution: a mixed solvent of 27.5 parts of methoxypropanol and 27.5 parts of isobutanol was added in a reaction vessel equipped with a thermometer, a thermostat, a stirrer, a reflux condenser, a nitrogen inlet tube, and a dropper, and heated to 110° C. Next, 121.5 parts of a mixture consisting of 25 parts of styrene, 27.5 parts of n-butyl methacrylate, 20 parts of branched higher alkyl acrylate (trade name "isostearyl acrylate" manufactured by Osaka Organic Chemical Industry Ltd.), 7.5 parts of 4-hydroxybutyl acrylate, 15 parts of phosphoric acid group-containing polymerizable monomer (*Note 2), 12.5 parts of 2-methacryloyloxyethyl acid phosphate, 10 parts of isobutanol, and 4 parts of t-butyl peroxyoctanoate was added to the above mixed solvent over 4 hours, and furthermore, a mixture consisting of 0.5 part of t-butylperoxyoctanoate and 20 parts of isopropanol was added dropwise over 1 hour. Then, the mixture was stirred and matured for 1 hour to obtain a phosphoric acid group-containing resin solution with a solid concentration of 50%. The acid value of the phosphoric acid group of the phosphoric acid group-containing resin was 83 mg KOH/g, the hydroxyl value was 29 mg KOH/g, and the weight average molecular weight was 10,000.
(*Note 2)
Phosphoric acid group-containing polymerizable monomer: 57.5 parts of monobutyl phosphoric acid and 41 parts of isobutanol were added in a reaction vessel equipped with a thermometer, a thermostat, a stirrer, a reflux condenser, a nitrogen inlet tube, and a dropper, the temperature was raised to 90° C., and 42.5 parts of glycidyl methacrylate was added dropwise over 2 hours. Then, after stirring and aging for 1 hour, 59 parts of isopropanol was added to obtain a phosphoric acid group-containing polymerizable monomer solution having a solid concentration of 50%. The acid value of the phosphoric acid group of the obtained monomer was 285 mg KOH/g.

Manufacturing Example 7

In the stirring mixer, 19 parts of "GX-3110", 35 parts of 2-ethyl-1-hexanol, 9 parts of phosphoric acid group-containing resin solution (*Note 1), and 0.2 parts of 2-(dimethylamino)ethanol were evenly mixed to obtain a flake-like lustrous pigment dispersion (P-3-2).

Manufacturing Example 8

In the stirring mixer, 38 parts of "GX-3110", 35 parts of 2-ethyl-1-hexanol, 18 parts of phosphoric acid group-containing resin solution (*Note 1), and 0.2 parts of 2-(dimethylamino)ethanol were evenly mixed to obtain a flake-like lustrous pigment dispersion (P-3-3).

Manufacturing Example 9

In the stirring mixer, 51 parts of "GX-3110", 35 parts of 2-ethyl-1-hexanol, 24 parts of phosphoric acid group-containing resin solution (*Note 1), and 0.2 parts of 2-(dimethylamino)ethanol were evenly mixed to obtain a flake-like lustrous pigment dispersion (P-3-4).

Manufacturing Example 10

In the stirring mixer, 63 parts of "GX-3110", 35 parts of 2-ethyl-1-hexanol, 30 parts of phosphoric acid group-containing resin solution (*Note 1), and 0.2 parts of 2-(dimethylamino)ethanol were evenly mixed to obtain a flake-like lustrous pigment dispersion (P-3-5).

Creation of Aqueous First Base Coating Material

Manufacturing Example 11

117 parts (solid portion 35 parts) of the acrylic resin emulsion (a) obtained in Manufacturing Example 1, 18 parts (solid portion 10 parts) of the hydroxy group-containing acrylic resin solution obtained in Manufacturing Example 2, 36 parts (solid portion 25 parts) of the polyester resin solution obtained in Manufacturing Example 3, and 37.5 parts (solid portion 30 parts) of "Cymel 251" (trade name, Allnex Japan, melanin resin, solid portion 80%) were mixed evenly, and furthermore, "Primal ASE-60" (trade name, Dow Chemical, polyacrylate-based thickener), 2-(dimethylamino)ethanol, and deionized water were added to obtain an aqueous first base coating material (1-1), in which the pH was 8.0, the coating material solid portion content was 32%, and the viscosity in a Ford cup No. 4 at 20° C. was 40 seconds. Additionally, the average light transmittance in the wavelengths 400 to 700 nm of the cured coating film at a thickness of 10 μm formed by the above aqueous first base coating material (1-1) was 100%.

Manufacturing Examples 12 to 16

The same process as Example 11 was followed, except that in Manufacturing Example 11, the composition was made as indicated in Table 1 below, and aqueous first base coating materials (1-2) to (1-6) having pH of 8.0, a coating material solid content of 32%, and a viscosity in a No. 4 Ford cup at 20° C. of 40 seconds were obtained.

Additionally, the average light transmittance in the wavelengths 400 to 700 nm of the cured coating film at a thickness of 10 μm formed by each of the above aqueous first base coating materials is shown in Table 1.

resin solution (b-2) obtained in Manufacturing Example 3, 37.5 parts (solid portion 30 parts) of "Cymel 251" (trade name, Allnex Japan, melanin resin, solid portion 80%), and 110 parts of the flake-like lustrous pigment dispersion (P-3-4) obtained in Manufacturing Example 9 were mixed evenly, and furthermore, "Primal ASE-60" (trade name, Dow Chemical, polyacrylate-based thickener), 2-(dimethylamino)ethanol, and deionized water were added to obtain an aqueous second base coating material (2-1), in which the pH was 8.0, the coating material solid portion content was 6%, and the viscosity in a Ford cup No. 4 at 20° C. was 40 seconds. The amount of flake-like lustrous pigment in the aqueous second base coating material (2-1) was 36 parts by mass relative to 100 parts by mass of the resin portion in the aqueous second base coating material (2-1).

Manufacturing Examples 18 to 26

The same process as Example 17 was followed, except that in Manufacturing Example 17, the composition and coating material solid content were made as indicated in

TABLE 1

|  |  | Manufacturing Example | | | | | |
|---|---|---|---|---|---|---|---|
|  |  | 11 | 12 | 13 | 14 | 15 | 16 |
| Aqueous first base coating material name | | 1-1 | 1-2 | 1-3 | 1-4 | 1-5 | 1-6 |
| Acrylic resin emulsion (a) | | 117 | 117 | 117 | 100 | 117 | 117 |
| A film-forming resin (b) other than acrylic resin emulsion (a) | Hydroxy group-containing acrylic resin solution (b-1) | 18 | 18 | 4 | 4 | 4 | 4 |
|  | Hydroxy group-containing polyester resin solution (b-2) | 36 | 36 | 36 | 43 | 36 | 36 |
| Curing agent (c) | "Cymel 251" | 37.5 | 37.5 | 37.5 | 37.5 | 37.5 | 37.5 |
| Extender pigment dispersion (P-1) | |  |  | 64 | 64 | 64 | 64 |
| Color pigment dispersion (P-2) | |  | 0.088 |  |  | 0.088 |  |
| Flake-like lustrous pigment dispersion (P-3-1) | |  |  |  |  |  | 50 |
| Average light transmittance (%) in wavelengths 400 to 700 nm of a 10 μm thick cured film | | 100 | 98 | 100 | 100 | 98 | 4 |

Creation of Aqueous Second Base Coating Material

Manufacturing Example 17

117 parts (solid portion 35 parts) of the acrylic resin emulsion (a) obtained in Manufacturing Example 1, 18 parts (solid portion 10 parts) of the hydroxy group-containing acrylic resin solution (b-1) obtained in Manufacturing Example 2, 36 parts (solid portion 25 parts) of the polyester Table 2 below, and aqueous second base coatings (2-2) to (2-10) having a pH of 8.0 and a viscosity in a No. 4 Ford cup at 20° C. of 40 seconds were obtained. Additionally, the amount of flake-like lustrous pigment in the aqueous second base coating material is shown in Table 2 as parts by mass of flake-like lustrous pigment relative to 100 parts by mass of resin solid content in the second base coating material.

TABLE 2

|  | Manufacturing Example | | | | | | | | | |
|---|---|---|---|---|---|---|---|---|---|---|
|  | 17 | 18 | 19 | 20 | 21 | 22 | 23 | 24 | 25 | 26 |
| Aqueous second base coating material name | 2-1 | 2-2 | 2-3 | 2-4 | 2-5 | 2-6 | 2-7 | 2-8 | 2-9 | 2-10 |
| Acrylic resin emulsion (a) | 117 | 117 | 117 | 117 | 117 | 117 | 117 | 117 | 117 | 117 |
| Hydroxy group-containing acrylic resin solution (b-1) | 18 | 18 | 18 | 18 | 18 | 18 | 18 | 18 | 18 | 18 |
| Hydroxy group-containing polyester resin solution (b-2) | 36 | 36 | 36 | 36 | 36 | 36 | 36 | 36 | 36 | 36 |
| "Cymel 251" | 37.5 | 37.5 | 37.5 | 37.5 | 37.5 | 37.5 | 37.5 | 37.5 | 37.5 | 37.5 |
| Flake-like lustrous pigment dispersion (P-3-1) |  |  |  |  |  |  |  | 50 |  |  |
| Flake-like lustrous pigment dispersion (P-3-2) |  |  |  |  | 63 |  |  |  |  |  |
| Flake-like lustrous pigment dispersion (P-3-3) |  |  |  |  |  | 91 |  |  |  |  |
| Flake-like lustrous pigment dispersion (P-3-4) | 110 | 110 | 110 | 110 |  |  |  |  | 110 | 110 |
| Flake-like lustrous pigment dispersion (P-3-5) |  |  |  |  |  |  | 128 |  |  |  |
| Coating material solid portion concentration (%) | 6 | 10 | 13 | 18 | 10 | 10 | 10 | 10 | 3 | 22 |
| Flake-like lustrous pigment content (parts by mass) | 36 | 36 | 36 | 36 | 14 | 28 | 43 | 8 | 36 | 36 |

Creating Test-Use Object to be Coated

A height 45 cm×width 30 cm×thickness 0.8 mm cold-rolled steel plate treated with zinc phosphate was coated through electrophoresis using a "Elecron GT-10" (trade name, Kansai Paint, thermosetting epoxy resin-based cationic electrodeposition coating material) to a dry film thickness of 20 μm, then heated to 170° C. for 30 minutes and cured, and then an intermediate coating material "Amirac TP-65-2" (trade name, Kansai Paint, polyester resin/amino resin-based, organic solvent-type intermediate coat) was further applied to a dry film thickness of 40 μm, heated to 140° C. for 30 minutes to cure, and then made a test-use object to be coated.

Creating Test Piece

Example 1

The aqueous second base coating material (2-2) obtained in Manufacturing Example 18 was electrostatically applied over a half (I portion) of an intermediate coat surface of the above test sample using a rotating atomization-type bell coating machine "ABB Cartridge Bell Paint System" (ABB, trade name) such that the dry film thickness was 3 μm, essentially forming a film corresponding to an inner plate base coating film, which was left to sit for 2 minutes. Then, the aqueous first base coating material (1-1) obtained in Manufacturing Example 11 was electrostatically applied using a rotating atomization-type bell coating machine "ABB Cartridge Bell Paint System" (ABB, trade name) to be adjacent to the half of the intermediate coat surface of the above test-use object on which the inner plate base coating film was not formed (II portion), such that the dry film thickness was 12 μm, forming a first base coating film. Then, after a 1 minute interval, the aqueous second base coating material (2-2) obtained in Manufacturing Example 18 was applied on the first base coating to achieve a dry film thickness of 3 μm, forming the second base coating film. After a 2 minute interval, it was preheated for 3 minutes at 80° C., the uncured base coating film was formed, and "KINO 6510" (trade name: Kansai Paint, hydroxy/isocyanate group curing-type acrylic urethane resin-based type two-component type organic solvent-type coating material) was applied thereover such that the dry film thickness was 30 μm, and after being left to sit for 7 minutes, the coating was heated at 140° C. for 30 minutes to simultaneously cure all the coating films and complete the test piece.

Examples 2 to 18 and Comparative Examples 1 to 8

The same process as Example 1 was performed, except that in Example 1, one of the aqueous first base coating materials (1-2) to (1-6) was applied to form a first base coating film, and then one of the aqueous second base coating materials (2-1) to (2-10) was applied to form a second base coating film, such that the combinations of the first base coating material and the second coating material and the dry film thicknesses shown in Table 3 below were achieved, creating each of the test pieces for Examples 2 to 18 and Comparative Examples 1 to 8.

Each of the test pieces obtained above was evaluated using the following test method. The evaluation results are shown in Table 3.

TABLE 3

| | | Portion I Second base coating material | | Portion II | | | | |
|---|---|---|---|---|---|---|---|---|
| | | | | First base coating material | | | Second base coating material | |
| | | Coating material name | Dry film thickness (μm) | Coating material name | Light transmittance (%) | Dry film thickness (μm) | Coating material name | Coating material solid portion concentration (%) |
| Examples | 1 | 2-2 | 3 | 1-1 | 100 | 12 | 2-2 | 10 |
| | 2 | 2-2 | 3 | 1-2 | 98 | 12 | 2-2 | 10 |
| | 3 | 2-2 | 3 | 1-3 | 100 | 12 | 2-2 | 10 |
| | 4 | 2-2 | 3 | 1-4 | 100 | 12 | 2-2 | 10 |
| | 5 | 2-2 | 3 | 1-5 | 98 | 12 | 2-2 | 10 |
| | 6 | 2-1 | 3 | 1-3 | 100 | 12 | 2-1 | 6 |
| | 7 | 2-2 | 5 | 1-3 | 100 | 9 | 2-2 | 10 |
| | 8 | 2-3 | 4 | 1-3 | 100 | 12 | 2-3 | 13 |
| | 9 | 2-4 | 4 | 1-3 | 100 | 12 | 2-4 | 18 |
| | 10 | 2-5 | 3 | 1-3 | 100 | 12 | 2-5 | 10 |
| | 11 | 2-6 | 3 | 1-3 | 100 | 12 | 2-6 | 10 |
| | 12 | 2-7 | 3 | 1-3 | 100 | 12 | 2-7 | 10 |
| | 13 | 2-1 | 3 | 1-5 | 98 | 12 | 2-1 | 6 |
| | 14 | 2-3 | 4 | 1-5 | 98 | 12 | 2-3 | 13 |
| | 15 | 2-4 | 4 | 1-5 | 98 | 12 | 2-4 | 18 |
| | 16 | 2-5 | 3 | 1-5 | 98 | 12 | 2-5 | 10 |
| | 17 | 2-6 | 3 | 1-5 | 98 | 12 | 2-6 | 10 |
| | 18 | 2-7 | 3 | 1-5 | 98 | 12 | 2-7 | 10 |
| Comparative Examples | 1 | 2-8 | 3 | 1-3 | 100 | 12 | 2-8 | 10 |
| | 2 | 2-9 | 2 | 1-3 | 100 | 12 | 2-9 | 3 |
| | 3 | 2-10 | 5 | 1-3 | 100 | 12 | 2-10 | 22 |
| | 4 | 2-8 | 3 | 1-5 | 98 | 12 | 2-8 | 10 |
| | 5 | 2-9 | 2 | 1-5 | 98 | 12 | 2-9 | 3 |
| | 6 | 2-10 | 5 | 1-5 | 98 | 12 | 2-10 | 22 |
| | 7 | 2-2 | 3 | 1-6 | 4 | 12 | 2-2 | 10 |
| | 8 | 2-2 | 10 | 1-3 | 100 | 12 | 2-2 | 10 |

TABLE 3-continued

| | | Portion II Second base coating material | | Evaluation results | | |
|---|---|---|---|---|---|---|
| | | Flake-like lustrous pigment content (parts by mass) | Dry film thickness (μm) | Finish of inner plate coated surface | Luster | Smoothness |
| Examples | 1 | 36 | 3 | Good | Excellent | Excellent |
| | 2 | 36 | 3 | Good | Excellent | Excellent |
| | 3 | 36 | 3 | Good | Excellent | Excellent |
| | 4 | 36 | 3 | Good | Excellent | Excellent |
| | 5 | 36 | 3 | Good | Excellent | Excellent |
| | 6 | 36 | 3 | Good | Excellent | Good |
| | 7 | 36 | 5 | Good | Excellent | Excellent |
| | 8 | 36 | 4 | Good | Excellent | Excellent |
| | 9 | 36 | 4 | Good | Good | Excellent |
| | 10 | 14 | 3 | Good | Good | Excellent |
| | 11 | 28 | 3 | Good | Excellent | Excellent |
| | 12 | 43 | 3 | Good | Excellent | Good |
| | 13 | 36 | 3 | Good | Excellent | Good |
| | 14 | 36 | 4 | Good | Excellent | Excellent |
| | 15 | 36 | 4 | Good | Good | Excellent |
| | 16 | 14 | 3 | Good | Good | Excellent |
| | 17 | 28 | 3 | Good | Excellent | Excellent |
| | 18 | 43 | 3 | Good | Excellent | Good |
| Comparative Examples | 1 | 8 | 3 | Good | Bad | Excellent |
| | 2 | 36 | 2 | Good | Poor | Good |
| | 3 | 36 | 5 | Good | Poor | Excellent |
| | 4 | 8 | 3 | Good | Bad | Excellent |
| | 5 | 36 | 2 | Good | Poor | Good |
| | 6 | 36 | 5 | Good | Poor | Excellent |
| | 7 | 36 | 3 | Bad | Excellent | Excellent |
| | 8 | 36 | 10 | Good | Poor | Bad |

Test Method

Finish of inner plate coated surface: each test piece (I portion) was visually inspected and evaluated.
Good: Spray dust adhesion was present, but could hardly be confirmed by visual inspection, and no unnaturalness such as mottle was found.
Poor: Spray dust adhesion could be visually confirmed, and a little unnaturalness such as mottle was present.
Bad: Spray dust adhesion could be visually confirmed, and unnaturalness such as mottle was observed clearly.

Luster: Each test piece (II portion) was visually inspected from different angles, and the luster was evaluated according to the following criteria.
Excellent: Changes in the metallic-ness depending on angle of observation were very large, and good luster with excellent flip-flop was present.
Good: Changes in the metallic-ness depending on angle of observation were large, and good luster with excellent flip-flop was present.
Poor: Changes in the metallic-ness depending on angle of observation were somewhat small, and somewhat poor luster with somewhat poor flip-flop was present.
Bad: Changes in the metallic-ness depending on angle of observation were small, and poor luster with poor flip-flop was present.

Smoothness: The appearance of each test piece (II portion) was visually examined and evaluated.
Excellent: Very excellent smoothness
Good: Excellent smoothness
Poor: Somewhat poor smoothness
Bad: Poor smoothness

INDUSTRIAL APPLICABILITY

The object to which the method for forming a multilayer coating film of the present invention can be applied is not specifically limited. Examples thereof include automobile bodies of automobiles, trucks, motorcycles, and busses; automobile parts; conventional electronics such as cellular phones, and audio devices; or the like. In particular, the present method is suitable for application to automobile bodies and automobile parts.

The invention claimed is:

1. A method for forming a multilayer coating film comprising successive application of a first base coating material, a second base coating material, and a clear coating material on a substrate in a wet-on-wet manner, wherein the first base coating material is a transparent coating material or a colored coating material, the second base coating material comprises a flake-like lustrous pigment, wherein the flake-like lustrous pigment is from 10 to 60 parts by mass relative to 100 parts by mass of the second base coating material's resin solid content, a concentration of the coating material solid content in the second base coating material is in the range from 5 to 20 mass % relative to the total mass of the second base coating material, and the a thickness of a coating film formed by the second base coating material is in the range from 1 to 8 μm based on the a cured coating film, and wherein the light transmittance of the coating film formed by the first base coating material is in the range of 95 to 100%.

2. The method for forming a multilayer coating film according to claim 1, wherein the first base coating material and the second base coating material are water-soluble coating materials comprising (a) an acrylic resin emulsion, (b) a film-forming resin other than the (a) acrylic resin emulsion, and (c) a curing agent.

3. The method for forming a multilayer coating film according to claim 1, wherein the flake-like lustrous pigment contained in the second base coating material is an aluminum flake pigment and/or a titanium dioxide coated flake-like pigment.

4. The method for forming a multilayer coating film according to claim 1, wherein the first base coating material comprises 0.003 to 20 parts by mass of a color pigment relative to 100 parts by mass of the resin solid content.

5. The method for forming a multilayer coating film according to claim 1, wherein a thickness of a film of the first base coating is within the range from 5 to 15 μm based on a cured coating film.

6. The method for forming a multilayer coating film according to claim 1, wherein a surface of the substrate is an electrodeposited coating film layer or an intermediate coating film layer.

7. A method for forming a multilayer coating film comprising:

forming an inner plate coating film by applying an inner plate base coating material on an inner plate surface of an automobile body upon which is formed an electrodeposited coating film or an intermediate coating film, and thereafter, forming an outer plate multilayer coating film by successively applying an outer plate first base coating material, an outer plate second base coating material, and a clear coating material on an outer plate surface of the automobile body, wherein the outer plate first base coating material is a transparent coating material or a colored coating material, the outer plate second base coating material comprises a flake-like lustrous pigment, wherein the flake-like lustrous pigment is from 10 to 60 parts by mass relative to 100 parts by mass of the outer plate second base coating material's resin solid content, a concentration of a coating material solid content in the second base coating material is in the range from 5 to 20 mass % relative to the total mass of the second base coating material, and a thickness of the coating film formed by the outer plate second base coating material is in the range from 1 to 8 μm based on a cured coating film, wherein the light transmittance of the coating film formed by the first base coating material is in the range of 95 to 100%.

\* \* \* \* \*